United States Patent Office 3,002,932
Patented Oct. 3, 1961

3,002,932
INORGANIC ANION-EXCHANGERS AND A PROCESS FOR THEIR PREPARATION
Ernest J. Duwell and Joseph W. Shepard, St. Paul, Minn., assignors to Minnesota Mining and Manufacturing Company, St. Paul, Minn., a corporation of Delaware
No Drawing. Filed Oct. 27, 1958, Ser. No. 769,544
10 Claims. (Cl. 252—179)

This invention relates to ion exchange media and particularly to inorganic anion exchangers.

The production and use of various media for preferential absorption or adsorption of ions and the subsequent separation of the ions therefrom has been widely practiced for many years. A great number of organic and inorganic cation exchange media have been discovered, yet only relatively few particular organic resinous materials have been found to have desirable capacity for the absorption of anions. Because of their chemical nature, these known organic anion exchange resins are ill-adapted to the absorption of oxidizing anions such as nitrate, arsenate, chromate, permanganate and the like anions, in that they are susceptible to oxidation thereby. This difficulty is even more pronounced at elevated temperatures since oxidation is more rapid under such conditions.

It is an object of the present invention to provide anion exchange materials and it is a particular object to provide inorganic exchange materials suitable for adsorption of oxidizing anions. Other objects will become apparent hereinafter.

It has been found that the above and other objects of this invention can be accomplished by employing compositions comprising substantially non-crystalline solid, insoluble, mixed hydrated oxides of certain homolomorphic elements of which the lower-valent member is present in a major molar amount and the higher-valent member is present in a minor molar amount.

By the term "homolomorphic elements" is meant a combination of elements of which one, the lower-valent member and major constituent, has a positive valence number lower by unity than that of the higher-valent member or members which are the minor constituents; for example, a combination of a divalent and a trivalent element or a combination of trivalent and tetravalent elements.

The compositions of the invention thus consist of hydrated oxides of pairs of elements, as exemplified by the pairs of homolomorphic elements aluminum and silicon, aluminum and titanium, zinc and aluminum and aluminum and zirconium. In each example the first mentioned member of the pair is the lower-valent member and has a positive valence number lower by unity than that of the other, higher-valent member. The useful anion-exchangers according to the present invention are substantially non-crystalline, insoluble mixed hydrated oxides having a stable, three-dimensional reticulated structure. It has been found that such structures are formed if each member of the combination has approximately the same ionic radius and precipitates from solution as the hydroxide or hydrated oxide at a pH of about 7 or somewhat below. Combinations of elements selected from the groups consisting of aluminum, silicon, titanium, zinc and zirconium are found to be suitable for the purposes herein described. Such elements are generically termed "metals" although silicon may approach the state of being a metalloid. Generally speaking, they are amphoteric in nature.

Although crystalline compositions formally involving hydrates of aluminum oxide and silicon dioxides are well known and are common constituents of the earth's crust, these natural substances have little or no anion-exchange properties. Surprisingly it has been found that particular hydrated, mixed aluminum-silicon oxides which are specific embodiments of this invention have high anion-exchange capacity.

The compositions of the present invention are prepared by coprecipitation of the hydrates of the combination of the oxides of the elements referred to hereinabove, in aqueous media at a pH of about 5 up to 7, followed by drying, washing the dried mixed hydrated oxide with water and again finally drying.

When the combination of hydrated metallic oxides is precipitated, there is formed a gel-like system, containing considerable quantities of water. On removal of this water at relatively low temperatures, solid hydrated metallic oxides are produced which have a three-dimensional structure which is similar to that of a crystal lattice, but is nevertheless non-crystalline. Thus, the X-ray diffraction spectra of these solids do not show patterns which are characteristic of crystalline structures. However, the metallic oxide hydrate which is present in minor amount appears to be firmly incorporated into this structure so as to be an integral part thereof. In addition, there is also present and bound therein an amount of a small anion such as $F^-$, $Cl^-$, $Br^-$ or the like, or hydroxyl ion, sufficient in amount to balance the charge of the latter metallic atom. This anion is not removable by washing, extraction or the like procedures, but is exchangeable. In view of all of the characteristics of the compositions of the invention, they may be defined as having a reticulate structure, since they have a three-dimensional structure which nevertheless clearly does not have a crystal lattice.

Broadly speaking, the process for the preparation of the anion-exchangers of the invention comprises coprecipitating mixed hydrated oxides of a pair of homolomorphic metals chosen from the group consisting of aluminum, silicon, titanium, zinc and zirconium, the lower-valent member of said pair being present in major amount, in an aqueous medium at a pH in the range of about pH 5 to 7, drying the aqueous mixture at a temperature below about 150° C., and washing the dried mixture with water to remove soluble impurities therefrom.

More specifically, in a suitable process of the invention about 1 to about 25 mole percent of a selected, suitable water-soluble derivative of the higher-valent member of the combination is dissolved in water together with about 99 to about 75 mole percent of a selected, suitable water-soluble derivative of the lower member of the combination to give a solution containing from about 5 to about 20 weight percent of solute, and which is acidic, having a pH value below about pH 5. If the aqueous solution is not of itself sufficiently acid, an amount of a suitable acid such as hydrochloric acid is added thereto. The resulting solution is then brought to about pH 5 up to 7 by the gradual addition of a base, such as aqueous sodium hydroxide or other soluble inorganic strong base, conveniently at a temperature in the range of about 20° C. to about 90° C. A precipitate of mixed hydrated oxides or hydroxides forms, and the aqueous slurry is dried by any convenient means, either at atmospheric or reduced pressure, at temperatures which do not bring about complete dehydration, as more fully described hereinafter.

Suitable water-soluble salts or other derivatives of the metals used in this process for the preparation of the composition of the invention are those derivatives which are water-soluble, preferably somewhat acidic and which on neutralization with base precipitate the hydrated oxide of the metal. Such compounds are, e.g., the halides of the metals, for example, aluminum chloride, aluminum fluoride, zinc chloride, zinc bromide, zirconium oxychloride and the like; esters or mixed halide-esters such as titanium dichloride diacetate, ethyl orthosilicate, titanium tetraacetate, basic zirconium acetate, zinc acetate and the like, as well as other soluble derivatives such as sodium silicate and the like.

While the bases preferred for neutralization and consequent coprecipitation of the hydrated mixed oxides are the alkali metal bases such as sodium hydroxide and potassium hydroxide, ammonium hydroxide and the like can also be employed in some instances.

Other methods of coprecipitation include addition of acid to an alkaline solution, mixing of acidic and basic solutions of the different members of the homolomorphic pair and addition of a neutral derivative of one, such as an ester, to a suspension of the other at near a pH of 7.

Owing to the bulky, gelatinous nature of the precipitates of hydrated oxides (or hydroxides) of the elements employed herein, the removal of any part of the water used as a solvent is very difficult. Small amounts of water may sometimes be decanted when settling or syneresis occurs. However, the preferred procedure is to evaporate the entire precipitation mixture to dryness at an elevated temperature.

The removal of the major amount of water and subsequent partial drying is carried out at a temperature which is lower than that necessary to cause dehydration of the hydrated oxide of the lower-valent member of the combination. This condition will vary depending upon the particular combination used but ordinarily a temperature of about 100° to about 140° C. is conveniently used. Preferably, drying temperatures in the range of about 100 to 125° C. are employed. If an excessively high temperature is employed for drying, say above about 150° C., the final product is found to show crystalline structure by X-ray diffraction patterns, or destruction of the reticulate structure showing that dehydration has occurred. This latter product is found to be unsatisfactory for the purposes of this invention, as it is essential that the product be substantially non-crystalline (as shown by X-ray diffraction patterns) in order to have anion-exchange properties.

The resultant cake is hard and rather like porcelain. It is pulverized and can then be washed with water to remove occluded soluble salts formed in the precipitation reaction and unbound soluble ions. Surprisingly, there is now no difficulty in filtration and the washing is very effective so that thorough washing is easily accomplished. Preferably, distilled or deionized water is used for this purpose and washing is continued until soluble ions, for example any unbound chloride ion present in the original precipitation mixture, are not detectable in the washes. Bound ions are ions which serve to neutralize valences of the higher homolomorphic element in excess of those satisfied in the three-dimensional reticulate structure. It appears in general that one valence of each atom of the higher homolomorphic element requires one of the anions present in the precipitation mixture. It appears that it is these bound ions which are exchanged for other anions and provide the capacity of the anion exchangers of this invention. Thus, although chloride ions are usually soluble, when bound in the anion exchangers of this invention they are not removable by washing but only by exchange for a more firmly bound ion such as sulfate or phosphate. It will thus be apparent that the bound ions should be ones which are readily replaceable and soluble ions, such as chloride and the like and salts of such ions are preferred in the precipitation step. When more firmly retained ions such as sulfate are present during the precipitation step, for example, when aluminum sulfate is employed, the resultant anion exchanger will not possess its optimum properties and it will be desirable to replace the sulfate ions with chloride ions by washing with strong sodium chloride solution or with hydroxyl ions by washing with dilute sodium hydroxide solution.

After the product has been washed, it can be used as an exchanger directly, or, if desired, it can be dried and preserved for later use. In the latter case drying is effected at a temperature preferably no higher than that employed after precipitation.

It is to be noted that the basic forms of the anion exchangers of this invention, that is those forms in which the bound ions are hydroxyl, are made by washing the salt forms, such as the chloride containing exchanger, with a dilute aqueous solution of base such as sodium hydroxide. For some reason which is obscure, the basic forms are apparently not obtained when precipitation is carried out so that a basic solution results, that is at a pH above 7, and the reaction mixture is dried as above described.

The relative amounts of the two homolomorphic elements which are components of the anion exchangers of the invention can be rather widely varied. From 1 to about 25 atom percent of the higher-valent constituent can be present in the mixture, the lower valent member varying correspondingly from 99 to 75 atom percent.

Typical products of this invention are white, free-flowing powdery or granular solids which show substantially no crystallinity by X-ray diffraction. The products of this invention are useful as anion exchangers, particularly for removal of oxidizing anions and in general show greater affinity for multivalent anions such as sulfate and phosphate and large complex ions such as permanganate than for simple monovalent ions such as chloride and bromide. When saturated with an absorbed anion, these products may be described as charged exchangers and can be regenerated to recover the anion by treatment, for example, with strong sodium chloride solution. The charged exchanger may however be valuable in itself, as a slowly releasing source of the anion, e.g. to provide phosphate in soil treatment or for other purposes. When the exchanger is charged with an organic anion such as a fatty acid residue, e.g. stearate or the like, the charged exchanger becomes organophilic and is useful for the thickening of organic systems such as mineral oil or as a filler in resinous compositions.

While the anion exchangers of this invention may appear to be superficially similar to some of the natural clays, comparison of their anion-exchange properties with the exchange properties of certain clays shows the remarkable difference which in fact exists. These two classes of substances are quite dissimilar in their respective ion-exchange behavior. Thus, in a report summarizing ion exchange in clay minerals, in "Endeavour," July 1958, pages 149 through 155, it is stated that kaolinite has comparable anionic and cationic exchange capacities which are of the order of 3 to 15 milliequivalents per 100 grams. In terms of sulfate ions this is from about 1.5 to 7.3 mgm. per gram. It will be noted that the products of this invention are from about 4 to about 14 times as effective as the higher of these two values and from about 15 to about 85 times as effective as the lower of these two values. The anion-exchangers of this invention are thus found to exhibit what amounts to a new kind of anion exchange activity for inorganic materials.

Having thus described the invention in broad general terms, it is now more specifically illustrated by examples which are furnished to show the best mode contemplated of practicing the invention but are not to be construed as limiting the scope of the invention. In these examples parts are by weight unless otherwise specified.

*Example 1*

A solution of 225 parts of zinc chloride and 100 parts of aluminum chloride hexahydrate is prepared in about 2500 parts of 0.1 molar hydrochloric acid. The pH of the solution is gradually raised above pH 5.5 by the addition of about 10 percent aqueous sodium hydroxide until it is just acid, at which point there appears to be maximum precipitation and flocculation of the gelatinous homolomorphic hydroxides. As much of the supernatant liquid as possible is decanted and the gelatinous residue is dried at 100° C. to a chalklike mass. It is then broken up, washed thoroughly with distilled water to remove soluble sodium chloride, and dried at 70° C. It corresponds to the approximate composition $$4ZnO \cdot \tfrac{1}{2}Al_2O_3 \cdot XH_2O$$

and apparently retains some chloride ion in its structure such that the formula may be more accurately stated as $4ZnO \cdot AlOCl \cdot XH_2O$.

A mixture of 60 g. of this anion exchanger and 60 g. of glass beads (⅛ inch in diam.) is placed in an 18 inch high column about 1.375 inches in diameter to a depth of several inches. The column is washed with 3.5 l. of a dilute (0.01 percent) aqueous solution of sodium dihydrogen phosphate. There is virtually complete absence of phosphate ions in the effluent. Saturation of the exchanger is achieved by washing with a further 500 ml. of 1 percent aqueous sodium dihydrogen phosphate monohydrate, to the point where phosphate begins to pass through the column. The capacity is thus found to be about 0.65 millimoles of phosphate ion per gram.

*Example 2*

A solution of 80 parts (0.332 mole) of aluminum chloride hexahydrate and 10 parts (0.0422 mole) of titanium dichloride acetate in 300 parts of distilled water is neutralized to a pH of 5 by the gradual addition of 25 parts of sodium hydroxide dissolved in about 250 parts of water. The entire mass of bulky gel-like colloidal precipitate which is formed is placed directly in an oven provided with circulating air at about 115° C. until the weight remains constant on further heating and water is no longer expelled. The resulting white amorphous solid is ground and washed repeatedly with distilled water until the filtrate no longer gives an appreciable precipitate with silver nitrate solution. The solid is then dried again to provide a white granular to powdery anion-exchanger designated Product A having the approximate composition $(4 \cdot Al_2O_3 \cdot TiO_2) \cdot XH_2O$, where X is approximately 3 and there is a balancing amount of bound chloride ions.

The effectiveness of this exchanger is shown by shaking 1 g. thereof with about 50 ml. of 0.01 molar sodium sulfate solution for 1 hour and filtering the solution. The filtrate from the exchanger gives no apparent precipitate when treated with 0.01 molar barium chloride solution.

The capacity of this exchanger is found by shaking 1.0 gram thereof with 200 ml. of sodium sulfate solution containing 1.38 milligrams of sulfate ion per milliliter, filtering and determining the residual concentration of sulfate ion gravimetrically. It is found to have decreased to 0.93 milligram of sulfate ion per milliliter, indicating that the capacity of the exchanger is about 0.938 millimole of sulfate ion per gram.

*Example 3*

This example illustrates the influence of the pH of precipitation, of the temperature of drying and the effectiveness of an anion-exchanger of the invention for sulfate ion and phosphate ions at various acidities and the capacity as a function of the concentration of sulfate ion.

Using a solution of 242.5 parts (1.82 moles) of anhydrous aluminum chloride and 55.0 parts (0.232 mole) of titanium dichloride diacetate in about 1000 parts of water, four anion exchangers, designated B, C, D and E respectively are prepared by the procedure of Example 2 with the following modifications:

B. Precipitated at about neutrality and dried at 130° C. (X-ray diffraction pattern indicates partial crystallinity.)
C. Precipitated at about neutrality and dried at 230° C. (X-ray diffraction pattern shows crystalline structure.)
D. Precipitated at pH of 6.5 measured on pH-meter and dried at 130° C.
E. Precipitated at pH of 10 measured by pH-meter and dried at 130° C.

Preparations A (Example 2), B and C are compared by an exchange capacity test conducted as described in Example 2 using 1.00 g. of exchanger in 100 ml. of sodium sulfate solution containing 0.69 mgm. of sulfate ion per ml. By precipitation of the remaining sulfate ion with barium chloride solution, it is found that A removes all the sulfate ion, B a part of it and C almost none. This shows that a temperature of drying of about 130° may result in a somewhat reduced exchange capacity, while drying at about 230° C. results in total loss of exchange capacity.

Preparations D and E, precipitated at different pH values, are compared as above using sodium sulfate solution of twice the above concentration and determining the sulfate ion concentration after shaking for about 2 hours and filtering off the insoluble exchanger. The results are found to be:

| Prep. | pH of pption | remaining $SO_4^=$ concentration | Capacity, mgm. $SO_4^=$/g. |
|---|---|---|---|
| D | 6.5 | 0.75 | 63 |
| E | 10 | 1.37 | 1 |

After the above process the recovered spent exchanger D is regenerated by stirring for about 3 hours with saturated sodium chloride solution, filtered, washed and again tested and the capacity is found to be 45 mgm. sulfate ion per gram. Longer treatment with sodium chloride solution tends to regenerate more completely.

Total capacity of preparation D is determined on approximately 1.0 g. samples using 200 ml. portions of solution of sodium sulfate and sodium dihydrogen phosphate containing respectively 1.33 mgm. sulfate ion and 1.38 mgm. phosphate ion per ml. and adjusting to different pH values by addition of dilute hydrochloric acid or sodium hydroxide. The data and results are shown in the following table:

| Wt. of Exchanger, g. | pH of Solution | Total Volume, ml. | Anion Conc. in filtrate, mgm./ml. | Capacity of Exchanger, Millimoles/g. |
|---|---|---|---|---|
| 1.0773 | 1.8 | 215 | 0.75 $SO_4^=$ | 1.02 |
| 1.0594 | 3.1 | 206 | 0.67 $SO_4^=$ | 1.26 |
| 0.9811 | 4.9 | 200 | 0.77 $SO_4^=$ | 1.19 |
| 0.9780 | 9.0 | 204 | 1.12 $SO_4^=$ | 0.41 |
| 0.9759 | 10.0 | 206 | 1.28 $SO_4^=$ | 0.04 |
| 0.9978 | 11.9 | 206 | 1.27 $SO_4^=$ | 0.04 |
| 0.9961 | 1.7 | 223 | 0.61 $PO_4^=$ | 1.07 |
| 1.0126 | 2.6 | 204 | 0.40 $PO_4^=$ | 2.00 |
| 1.0050 | 4.0 | 200 | 0.48 $PO_4^=$ | 1.87 |
| 1.0554 | 6.7 | 201 | 0.55 $PO_4^=$ | 1.63 |
| 1.0061 | 10.4 | 204 | 0.98 $PO_4^=$ | 0.79 |
| 1.0003 | 11.4 | 222 | 1.10 $PO_4^=$ | 0.33 |

The effect of concentration of the sulfate ion in the solution from which it is absorbed is shown by measuring the exchange capacity of preparation D by the above procedures in solutions of sodium sulfate varying from about 0.001 molar to about 1 molar. The solutions are made up from a 1 molar stock solution, diluting pipetted amounts to suitable volumes to furnish the approximate molarity desired. Portions of each solution are analyzed for true sulfate ion concentration before and after shaking with approximately 1 g. portions of preparation D for about 3 hours. The approximate initial concentrations and the capacities determined are found to be:

| Molarity: | Capacity mgm. $SO_4$/g. |
|---|---|
| 0.1 | 100 |
| 0.5 | 109 |
| 0.1 | 127 |
| 0.05 | 122 |
| 0.01 | 113 |
| 0.005 | 110 |
| 0.001 | [1] >80 |

[1] 1.0 l. of solution does not quite equal capacity of exchangers.

It is apparent that for practical purposes the capacity of the exchanger is not affected by the sulfate ion concentration throughout the range tested and that the composition possesses excellent anion exchange capacity.

Example 4

A solution of 50 parts (0.375 mole) of anhydrous aluminum chloride in 1000 parts of water is brought to about pH 5.5 by the addition of 10 N sodium hydroxide solution, to produce a suspension of aluminum hydroxide. To this suspension are added 15.6 parts (0.0715 mole) of ethyl orthosilicate with vigorous shaking so that the latter penetrates into the structure of the aluminum hydroxide and is hydrolyzed therein. The resultant gel-like precipitate is dried at 120° C., washed as in the previous examples and again dried at 120° C. There is obtained a white, powdery anion-exchanger which corresponds to the approximate composition $5Al_2O_3 \cdot 2SiO_2 \cdot XH_2O$, which contains a balancing amount of bound chloride ions. This composition is designated hereinafter as preparation K. The concentration of sulfate ion in a solution of sodium sulfate is reduced from 1.33 mgm. per ml. to 0.99 mgm. per ml. by shaking 200 ml. thereof with 1.0 g. of this exchanger, which therefore has a capacity of about 68 mgm. of sulfate ion per gram.

A similar exchanger is prepared by dissolving the ethyl orthosilicate first in about 50 parts of 10 normal sodium hydroxide to form a solution of sodium silicate, to which the aluminum chloride solution is then added gradually. Further sodium hydroxide solution is added to bring the pH to about 6.5 and the product is processed as above to give an anion-exchanger having similar properties and exchange capacity, and designated hereinafter as preparation L.

The process for preparing L is repeated using commercially available sodium silicate solution in proportions corresponding to about 6 aluminum atoms per atom of silicon, together with a sufficient amount of sodium hydroxide solution to bring the mixture to about pH 6.5, and drying at about 130° C.; and a product designated hereinafter as M is obtained which shows a capacity of about 84 mgm. of sulfate ion per gram.

The immediately preceding procedure using commercial sodium silicate solution is repeated twice except that one batch is precipitated at about pH 6 (designated N) and the other is precipitated at about pH 8 (designated O). Both are dried at about 130° C. and processed as above to provide the respective exchangers. It is found that N has a capacity of about 25 mgm. sulfate ion per gram when tested as above, while O has virtually no anion exchange capacity.

The above products are analyzed for their respective contents of sodium and chlorine with the following results:

|   | Percent Na | Percent Cl | Capacity |
|---|---|---|---|
| K | 0.71 | 5.79 | 68 |
| L | 0.49 | 6.12 | 68 |
| M | 0.21 | 5.37 | 84 |
| N | 0.08 | 2.03 | 24 |
| O | 2.07 | 0.18 | 0 |

Ultimate analysis of preparation M shows the presence of 27.7 percent by weight of aluminum, 4.78 percent by weight of silicon and loss of weight on ignition at 1000° C. of 36.7 percent by weight. From these analytical results the formula is calculated to be:

$$Al_{1.715}Si_{0.284}O_{3.0}Cl_{0.239} \cdot 3.1H_2O \cdot 0.015NaCl$$

It will be noted that the total valence bonds of the aluminum and silicon together (6.28) correspond to the total number available from the oxygen and chlorine (6.24) within probable limits for an analysis of such a composition. The residual sodium chloride is presumably occluded and fails to be removed even under fairly vigorous washing. It is assumed, without wishing to be bound by the theory, that the effectiveness of the exchangers of the present invention is due to the presence of replaceable ions in the reticulate three-dimensional structure made possible by a cross-linking effect between the homolomorphic elements such that valences are available for extraneous ionic species. Based on this assumption it is, however, very surprising that the exchange capacity does not decrease with respect to more polyvalent ions, each of which would presumably tie up more available valences, but instead actually increases as shown in Example 3 above so that at a comparable pH below 7 the capacity for phosphate ion is approximately 50 percent greater than the capacity for sulfate ions. This is also found to be the case with preparation M which shows a capacity of 82 mgm. of sulfate ion per gram at pH 5.8 and of 139 mgm. of phosphate ion per gram at pH 4.5. Examination of this preparation by X-ray diffraction shows that it is substantially non-crystalline showing only slight suggestion of the presence of crystalline $SiO_2$ and $Al_2O_3$. However, when heated at about 200° C. for 1 hour, it is found to comprise considerable amounts of these substances and to possess no exchange capacity.

Example 5

A series of alumino-silicate exchangers of the type of Example 4 is prepared using in each instance a solution of 15 parts of anhydrous aluminum chloride in 300 parts of water by adding respectively varying amounts of an approximately 0.2 molar solution of sodium silicate (formed by dissolving 0.2 mole of ethyl orthosilicate in a solution containing 5 moles of sodium hydroxide and diluting to volume). The resulting alumino-silicate solution is brought to a pH of about 6.5 whereupon a gelatinous precipitate forms which is dried and the product processed as described in Example 4. The resultant series of exchangers, in which the ratio of alumina to silicon varies from about 3 to 1 to about 60 to 1, is tested, employing 1.00 g. portions in 200 ml. of sodium sulfate solution containing 1.32 mgm. sulfate ion per milliliter as described hereinabove. The depleted solutions are analyzed to determine the respective exchange capacities as follows:

| Approximate Equivalents of $Al^{+++}$ Present for each Equivalent of $Si^{++++}$ | Depleted Solution, mgm. $SO_4$/ml. | Exchange Capacity, mgm. $SO_4^-$/g. |
|---|---|---|
| 3 | 1.18 | 28 |
| 6 | 1.06 | 52 |
| 9 | 0.85 | 94 |
| 16 | 0.74 | 116 |
| 30 | 0.80 | 104 |
| 45 | 0.83 | 98 |
| 60 | 0.94 | 76 |

It is apparent that the effective range is from about 1 to about 25 atom percent of silicon in the ratio of aluminum to silicon and that exchangers in which the ratio is from about 2 to about 10 atom percent are particularly valuable. The effectiveness of a particular composition appears to be somewhat dependent upon achieving uniform homogeneous precipitation of the homolomorphic elements without fractional precipitation. The relatively lower effectiveness observed in this example for compositions having lower ratios is apparently caused by some inhomogeneity.

Example 6

A solution of 100 parts (0.75 mole) of anhydrous aluminum chloride and 16.6 parts (0.0935 mole) of zirconium oxychloride in about 900 parts of water is precipitated by addition of a sufficient amount of about 5 normal sodium hydroxide solution to bring the pH of the solution to about pH 6.5. The gelatinous mass which forms is dried at about 130° C., pulverized, washed and dried as above. The white product corresponds approximately to a ratio of 8Al:Zr, and includes a balancing amount of chloride ion. It has an exchange capacity of about 100 mgm. of sulfate ion per gram.

Example 7

Twenty parts of preparation M above is shaken with a solution of about 20 parts of sodium stearate in about 1000 parts of water for about 4 hours and the exchanger saturated with stearate ions is collected, washed with water and dried at about 90° C. One part of the saturated exchanger is moistened with ethanol and mixed with seven parts of mineral oil (viscosity 130 centipoises) in a ball mill for about one week and the resultant mixture is found to be a firm grease.

Example 8

Anion-exchangers comprising mixed hydrated oxides of aluminum and titanium, preparation A of Example 2, and of aluminum and silicon, preparations L and M of Example 4, are tested to determine their capacity for sulfate ions at an elevated temperature by treatment of 1.0 g. portions of each exchanger with 100 ml. portions of the aqueous test solutions of sodium sulfate used above, under reflux conditions (about 100° C.) and for about 1 hour. After removing the exchanger by filtration, analysis of the respective supernatant liquids shows that the sulfate ion exchange capacity of each preparation in aqueous solution of this temperature is substantially the same as the capacity thereof at ordinary temperatures.

Example 9

One gram portions of anion-exchangers comprising mixed hydrated oxides of aluminum and titanium, preparation A of Example 2 and of aluminum and silicon, preparation L of Example 4, are shaken with 100 ml. portions of a dilute neutral aqueous solution of potassium permanganate. It is found that the color of permanganate ion is almost completely removed by the exchangers which become deeply colored. When the purplish charged exchanger is treated with a saturated sodium chloride solution, the permanganate ion is released, regenerating the exchanger of Cl⁻ form and producing a purplish solution, while the exchanger is again substantially colorless. After removing the exchanger by filtration, it is again capable of removing permanganate ion. For comparison, this test is repeated employing a commercially available resinous strong base-type organic anion-exchanger containing quaternary ammonium groups ("Amberlite IRA 400"). The purple color of permanganate ion disappears from the solution, but permaganate ion cannot be recovered from the exchanger, indicating that discharge of the color was caused by reduction of the permanganate ion and not by absorption or exchange.

What is claimed is:

1. An anion-exchanger consisting essentially of a stable, substantially non-crystalline, solid,, three-dimensional reticulate structure composed of mixed insoluble hydrated oxides of a pair of metals selected from the group consisting of aluminum, silicon, titanium, zinc and zirconium, one member of said pair being present in amount at least about three times the molar amount of the other member of said pair and having a positive valence number in the oxide state lower by unity than the other member of said pair, the higher valent member of said pair being present in an amount of at least 1 atom percent, together with an amount of bound anion sufficient to balance the charge of the higher valent member of said pair.

2. An anion-exchanger consisting essentially of a stable, substantially non-crystalline, solid, three-dimensional reticulate structure composed of mixed hydrated oxides of a pair of elements chosen from the group consisting of aluminum, silicon, titanium, zinc and zirconium one member of said pair having a positive valence number in the oxide state lower by unity than the other member of said pair, the higher-valent member of said pair constituting from about 1 to about 25 atom percent of said pair and an amount of an anion sufficient to balance the charge of the higher-valent member of said pair firmly bound in said structure.

3. An anion-exchanger consisting essentially of a stable, substantially non-crystalline solid, three-dimensional reticulate structure composed of mixed hydrated oxides of aluminum and silicon together with an amount of a bound anion sufficient to balance the charge of said hydrated oxide of silicon, the hydrated aluminum oxide being present in amount at least three times the molar amount of said hydrated oxide of silicon and said hydrated oxide of silicon being present in an amount of at least 1 atom percent.

4. An anion-exchanger consisting essentially of a stable, substantially non-crystalline solid, three-dimensional reticulate structure composed of mixed hydrated oxides of aluminum and silicon, the silicon being present in amount of from about 1 to about 25 percent of the aluminum together with an amount of an anion sufficient to balance the charge of the said hydrated oxide of silicon bound in said structure.

5. An anion-exchanger consisting essentially of a stable, substantially non-crystalline solid, three-dimensional reticulate structure composed of mixed hydrated oxides of zinc and aluminum together with an amount of a bound anion sufficient to balance the charge of said hydrated oxide of aluminum, the hydrated zinc oxide being present in amount at least about three times the molar amount of said hydrated oxide of aluminum, the said hydrated oxide of aluminum being present in an amount of at least 1 atom percent.

6. An anion-exchanger consisting essentially of a stable, substantially non-crystalline solid, three-dimensional reticulate structure composed of mixed hydrated oxides of aluminum and titanium together with an amount of a bound anion sufficient to balance the charge of said hydrated oxide of titanium, the hydrated aluminum oxide being present in amount at least about three times the molar amount of said hydrated oxide of titanium, the said hydrated oxide of titanium being present in an amount of at least 1 atom percent.

7. An anion-exchanger consisting essentially of a stable, substantially non-crystalline solid, three-dimensional reticulate structure composed of mixed hydrated oxides of aluminum and zirconium together with an amount of a bound anion sufficient to balance the charge of said hydrated oxide of zirconium, the hydrated aluminum oxide being present in amount at least about three times the molar amount of said hydrated oxide of zirconium, the said hydrated oxide of zirconium being present in an amount of at least 1 atom percent.

8. The process for the preparation of an anion-exchanger which comprises coprecipitating mixed hydrated oxides of a pair of elements chosen from the group consisting of aluminum, silicon, titanium, zinc and zirconium in an aqueous medium at a pH in the range of about pH 5 to 7, the lower-valent member of said pair being present in amount at least about three and not more than ninety-nine times the molar amount of the higher-valent member of said pair, drying the aqueous mixture by evaporation at a temperature below about 150° C., and washing the dried mixture with water to remove soluble impurities therefrom.

9. The process for the preparation of an anion-exchanger which compises preparing an aqueous acidic solution of water-soluble derivatives of a pair of metals chosen from the group consisting of aluminum, silicon, titanium, zinc and zirconium, one member of said pair being present in amount at least about three and not more than ninety-nine times the molar amount of the other member of said pair and having a positive valence number in the oxide state lower by unity than the other member of said pair, adding to said solution a strong inorganic base to bring the solution to a pH in the range of about pH 5 to 7 to coprecipitate the said pair of metals as a mixture of hydrated oxides, drying the said mixture by evaporation at a temperature below about 150° C., and washing the dried mixture with water to remove soluble impurities therefrom.

10. The process for the preparation of an anion-exchanger which comprises preparing an aqueous acidic solution of water-soluble salts of a pair of metals chosen from the group consisting of aluminum, silicon, titanium, zinc and zirconium, one member of said pair being present in amount at least about three and not more than ninety-nine times the molar amount of the other member of said pair and having a positive valence number in the oxide state lower by unity than the other member of said pair, adding to said solution a strong inorganic base to bring the solution to a pH in the range of about pH 5.5 to 7 to coprecipitate the said pair of metals as a mixture of their hydrated oxides, drying the said mixture by evaporation at a temperature in the range of about 100 to 125° C. and washing the dried mixture with water to remove soluble impurities therefrom.

References Cited in the file of this patent
UNITED STATES PATENTS

| | | |
|---|---|---|
| 2,157,510 | Urbain et al. | May 9, 1939 |
| 2,208,173 | Urbain et al. | July 16, 1940 |
| 2,331,473 | Hyman | Oct. 12, 1943 |
| 2,334,871 | Free et al. | Nov. 23, 1943 |

UNITED STATES PATENT OFFICE
CERTIFICATE OF CORRECTION

Patent No. 3,002,932                          October 3, 1961

Ernest J. Duwell et al.

It is hereby certified that error appears in the above numbered patent requiring correction and that the said Letters Patent should read as corrected below.

Column 7, line 4, in the table, under the heading "Molarity", for "0.1" read -- 1.0 --; column 9, line 63 for "permaganate" read -- permanganate --; column 11, line 4, for "compises" read -- comprises --.

Signed and sealed this 10th day of July 1962.

(SEAL)
Attest:

ERNEST W. SWIDER                                            DAVID L. LADD
Attesting Officer                                                Commissioner of Patents